United States Patent [19]

Pecen et al.

[11] Patent Number: 5,096,598
[45] Date of Patent: Mar. 17, 1992

[54] PRESSURIZED PURGING OF A LIQUID DRAIN FOR A VACUUM SYSTEM

[75] Inventors: Roger P. Pecen; Richard G. Hartog, both of Michigan City, Ind.

[73] Assignee: Sullair Corporation, Michigan City, Ind.

[21] Appl. No.: 485,192

[22] Filed: Feb. 26, 1990

[51] Int. Cl.$^5$ .............................................. B01D 17/00
[52] U.S. Cl. ........................................ 210/741; 55/55;
  55/160; 55/189; 55/218; 137/572; 137/624.12;
  137/624.13; 210/114; 210/116; 210/139;
  210/143; 210/136; 210/767; 210/416.1;
  501/145
[58] Field of Search ................. 55/161, 162, 215, 421,
  55/416.1, 218, 219, 55, 189, 160, 52, 196;
  210/116, 139, 744, 767, 117, 138, 739, 741, 141;
  137/178, 572, 624.11, 624.12, 624.13; 264/101;
  425/197; 418/DIG. 1, DIG. 2; 501/145, 149

[56] References Cited

U.S. PATENT DOCUMENTS

| | | | |
|---|---|---|---|
| 2,007,074 | 7/1935 | Clemens | 425/197 |
| 2,413,330 | 12/1946 | Miller | 501/145 |
| 2,481,326 | 9/1949 | Miller | 501/145 |
| 2,546,434 | 3/1951 | Farnsworth | 55/215 |
| 2,696,462 | 12/1954 | Bodkin | 210/116 |
| 2,829,666 | 4/1958 | Landers et al. | 137/178 |
| 3,173,164 | 3/1965 | Congdon | 15/353 |
| 3,249,438 | 5/1966 | Topol | 55/421 |
| 3,912,629 | 10/1975 | Sonoda | 210/114 |
| 4,029,487 | 6/1977 | Brandt | 55/309 |
| 4,179,768 | 12/1979 | Sawyer | 15/353 |
| 4,246,676 | 1/1981 | Hallsworth et al. | 15/353 |
| 4,329,235 | 5/1982 | Koltse | 210/143 |
| 4,663,033 | 5/1987 | Marr | 210/116 |

FOREIGN PATENT DOCUMENTS

| | | | |
|---|---|---|---|
| 2809576 | 9/1979 | Fed. Rep. of Germany | 55/162 |
| 142989 | 11/1980 | Japan | 418/DIG. 1 |
| 191491 | 11/1982 | Japan | 418/DIG. 1 |
| 1366286 | 1/1988 | U.S.S.R. | 425/197 |
| 1592953 | 7/1981 | United Kingdom | 264/101 |

OTHER PUBLICATIONS

Sketch MS-41007 directed to a No. 71 Trap for Mechanical Plumbing, Feb. 13, 1964, one page of drawing.

Primary Examiner—Robert A. Dawson
Assistant Examiner—Joseph Drodge
Attorney, Agent, or Firm—James A. Wanner; William D. Lanyi; David H. Hitt

[57] ABSTRACT

The present invention is directed to an improved purging of a liquid drain system for a liquid separator used in a moisture laden process vacuum system wherein the liquid separated from the flow stream by the separator is collected in an accumulator which in turn is periodically pressure purged to quickly remove the liquid contents of the accumulator while such accumulator is out of fluid communication with the liquid separator so that the vacuum process need not be interrupted. A pressure responsive drain valve is connected between the separator and the accumulator. The pressure used to purge the accumulator also activates the normally opened drain valve to inhibit the fluid flow between the separator and the accumulator. A pressure responsive drain is connected to the accumulator and opens in response to the increased pressure used to purge the accumulator and close the normally opened drain valve.

12 Claims, 1 Drawing Sheet

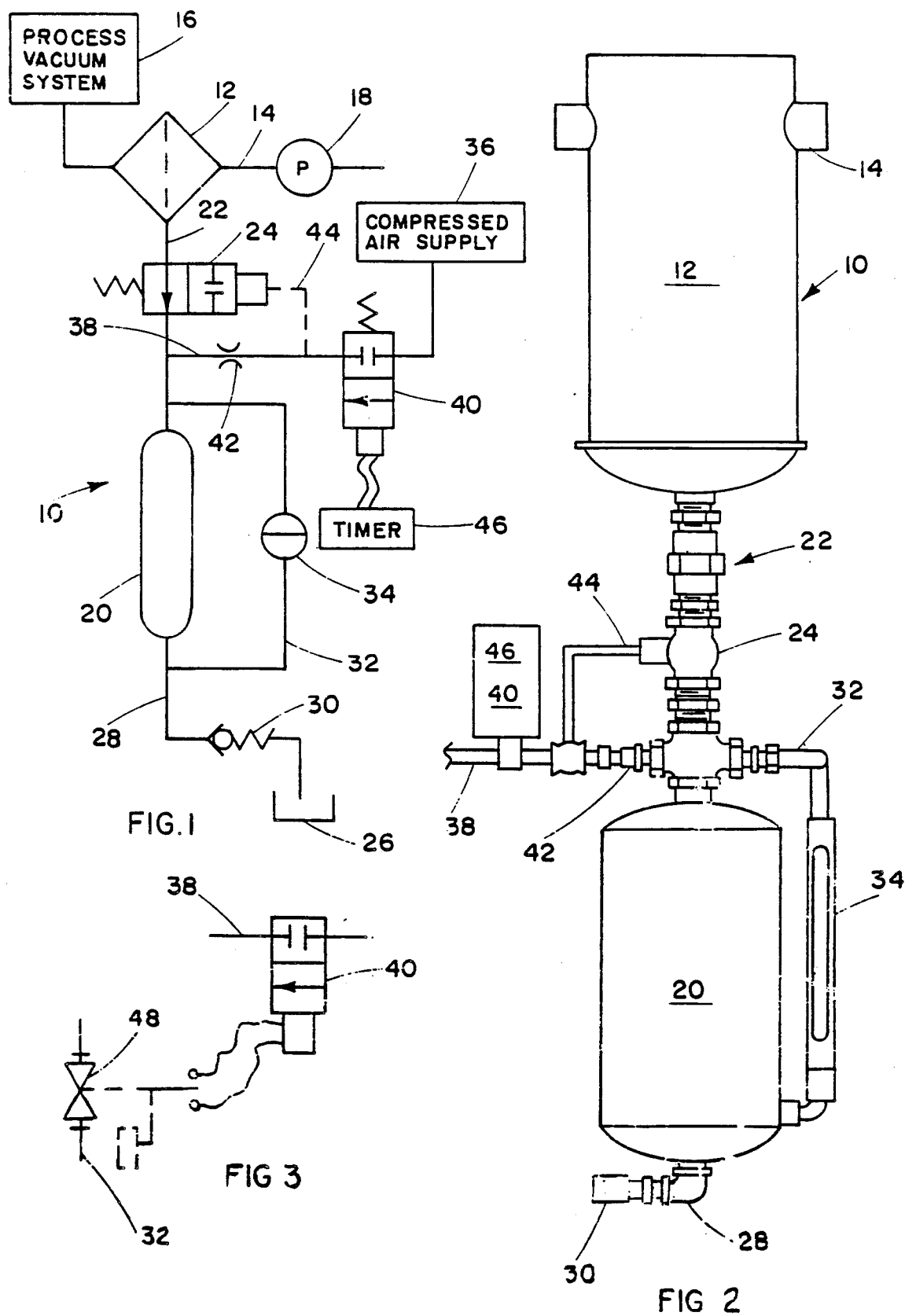

PRESSURIZED PURGING OF A LIQUID DRAIN FOR A VACUUM SYSTEM

FIELD OF THE INVENTION

The field of the present invention is the purging of a liquid drain system for use with a liquid separator or filter which is located in a moisture laden process vacuum system wherein it is desirable to quickly purge accumulated liquid without interruption of the vacuum system process.

BACKGROUND OF THE INVENTION

It is quite well known to have a process vacuum system with the gas stream being generated by a vacuum pump which is sensitive to liquid contaminants. Therefore, a liquid separator or filter is positioned between the process vacuum system and the downstream vacuum pump The liquid that is separated from the gas stream by the separator or filter is then collected by a liquid accumulator, and such collected liquid must be periodically purged from the accumulator. Such purging often has been conducted by manually closing a valve between the separator and the accumulator so as to disconnect the accumulator from the separator, while at the same time connecting the accumulator to atmosphere. Unfortunately, this manual process requires operator attention as to the amount of liquid collected in the accumulator. Furthermore, since this is inherently a gravity draining system, the draining process is slow. This is especially critical where the liquid separation at the filter is excessive relative to the time taken for atmospheric purging of the accumulator.

SUMMARY OF THE INVENTION

The present invention is directed to purging a liquid drain system for a vacuum system wherein accumulated liquid can be quickly purged from the system while the vacuum system is still subjected to vacuum and reducing the amount of time that a liquid accumulator is disconnected from the liquid separator.

It is therefore an object of the present invention to decrease the time required to drain the accumulator by subjecting the accumulator to a source of pressure above atmospheric pressure, such as compressed air.

It is an object of the present invention to assure that where the accumulator and liquid separator are connected at all times except when the accumulator is being purged, that the valve means between the accumulator and separator is responsive to a parameter of the actual purging process, preferably sensing when compressed air is applied to the accumulator.

It is a further object of the present invention to reduce the amount of operator diligence required in the liquid draining process, and thus some form of automatic operation is substituted for manual operation, such automatic operation included either timed operation or operation responsive to the level of liquid in the accumulator.

It is yet another object of the present invention to provide a simple liquid drain system which is capable of removing varying amounts of separated liquid from the accumulator simply by varying either the drain cycle time and/or the sensed liquid level set point.

It is furthermore an object of the present invention to provide a liquid drain system which has few moving parts and does not require ancillary pumps to drain the accumulator.

It is thus an object of the present invention to provide pressure purging of a liquid drain system for a liquid separator associated with a process vacuum system having a vacuum pump for generating a vacuum for the vacuum system with a liquid separator therebetween, the liquid drain system including the separator, a liquid accumulator, a fluid conduit connecting the separator and the accumulator whereby liquid removed from process gas flow through the separator can be drained to the accumulator, a drain valve in the fluid conduit, and a drain connected to the accumulator, with the improvement comprising a compressed air supply connected to the accumulator downstream of the drain valve with a control for closing the drain valve and permitting the supply of pressurized air from the compressed air supply to subject the accumulator to pressure to purge the accumulator of liquid to the drain while the accumulator is isolated from the separator.

BRIEF DESCRIPTION OF THE DRAWINGS

FIG. 1 is a schematic diagram showing the liquid drain system of the present invention as connected in a process vacuum system.

FIG. 2 is an elevational view of the components which together make the liquid drain system along with the liquid separator.

FIG. 3 is a partial schematic diagram showing a modification to the control in the liquid drain system of FIG. 1.

DESCRIPTION OF PREFERRED EMBODIMENTS

The present invention is directed to purging a liquid drain system generally indicated by 10 in both FIGS. 1 and 2. The liquid drain system is designed to be connected to a liquid separator or filter 12 interposed in a vacuum line 14 which provides fluid communication between a process vacuum system 16 and a vacuum pump 18. The particular form of vacuum pump 18 and the particular process of the vacuum system 16 are not material to the present invention other than the gas flow through fluid communications means 14 has a sufficient moisture content to require a liquid separator or filter 12. One example of such a process gas vacuum system is a vacuum drying system to dry clay to make china.

The liquid separated from the process vacuum system gas stream at the separator 12 is collected in an accumulator 20. For this purpose, fluid conduit means 22 connects the bottom of the separator 12 with the accumulator 20. Located in the fluid conduit 22 is a normally open drain valve 24 which selectively permits or prohibits fluid communication between the separator 12 and the accumulator 20. The accumulator 20 is also connected to sump 26 by drain means including conduit 28 which is separate and remote from the entrance of conduit 22 into the accumulator 20. In the preferred form, the means leading to sump 26 includes a spring biased check valve 30. A conduit 32 may also be provided with a sight gage 34 with the circuit 32 being in parallel with the accumulator and thus connected to both conduits 22 and 28.

The circuit just described, except with the valves 24 and 30 being manually operated valves, is a typical liquid drain system for a liquid separator and a moisture laden vacuum system. When the valve 24 is open and the valve 30 is closed, liquid collected by the separator 12 can be drained through the conduit 22 and valve 24 to the accumulator 20. With the valve 24 manually closed and the valve 30 manually opened, the accumulator is disconnected from the vacuum system, and the accumulator can be connected to atmosphere, permitting the liquid contained therein to slowly drain to sump 26.

With the present invention, a compressed air supply 36 is connected to the accumulator 20, preferably by an air supply line 38, which is connected to conduit 22 downstream of valve 24 and upstream of the accumulator 20. A normally closed compressed air supply valve 40 is located in the line 38. When it is desired to purge the accumulator 20, valve 24 is closed to disconnect the accumulator 20 from the separator 12, and valve 40 is opened to direct air under pressure from the compressed air supply 36 to the accumulator 20. Because the accumulator 20 is now pressurized, the collected liquid therein can quickly drain from the accumulator 20 through conduit 28 to sump 26. Because the accumulator is subjected to high pressure during the purging process, the valve 30 need only be a check valve, as shown schematically in FIG. 1. The bias on check valve 30, normally a spring bias, need only be sufficient to retain the collected liquid in accumulator 20, which is also subject to the vacuum in line 14 when the drain valve 24 is open. When the drain valve 24 is closed and air supply valve 40 is open, the pressure from the compressed air supply, along with the liquid head in 20 will cause the check valve 30 to open to permit purging.

Since it is desirable to have the accumulator 20 disconnected from the separator 12 for the least amount of time, in the preferred control of the present invention, the operation of the drain valve 24 is dependent upon a sensed parameter of the purging operation, preferably the flow of the compressed air used for pressure purging the accumulator 20. For this reason line 38 is provided with an orifice 42, and the drain valve 24 is a pressure responsive valve. A pilot line 44 is connected to the pressure responsive valve 24 and also to line 38 upstream of the orifice 42 but downstream of the air supply valve 40. Thus when the valve 40 is open, the pilot pressure in line 44 will bias the valve 24 to its closed position so as to disconnect the accumulator 20 from the separator 12. However, when the air supply valve 40 is closed, there will not be positive pressure in the pilot line 44 from the compressed air supply 36, and thus valve 24 will be permitted to return to its normally open position draining of the separator 12 to the accumulator 20. Thus the drain valve 24, and therefore the fluid communication between the separator 12 and the accumulator 20, is closed only when the accumulator is subjected to its pressurized purging operation.

While various input parameters may be utilized to control the operation of air supply valve 40, and thus the initiation and termination of the pressurized purging process, two input parameters that come to mind are time and liquid level within the accumulator 20. As noted in FIG. 1, a timer 46 is provided to provide an electrical control of the air supply valve 40 which is a solenoid valve. In FIG. 3, the valve 40 and timer 46 are shown to be an integral unit. An alternative to time operation is shown in FIG. 3 wherein the sight gage 34 of FIGS. 1 and 2 has been replaced by a liquid level switch 48 which is used to control the solenoid valve 40. Of course various combinations of control are also possible, such as where the purging process is initiated by a liquid level switch such as 48, but the length of the purging cycle is controlled by a timer such as 46.

When a purely timed purging operation is contemplated, the ratio of the open and closed time cycle of the air supply valve 40 should be made dependent upon such variables as a) the volumetric gas flow through line 14 and the moisture content of the gas, and thus the amount of liquid separated by the filter 12 per unit of time, and b) the volume of liquid which can be purged from the accumulator 20 by the pressurized purging process per unit of time. Of course with accumulator 20 being subjected to pressurized air during the purging process, the amount of liquid purged per unit of time is greatly increased. However, the size of the separator or filter 12 will be somewhat dependent upon the amount of time necessary to purge the accumulator 20 even when subjected to positive pressure. Since the vacuum process and moisture content may vary, it is of course desirable to have a timer 46 which is variable for both its energized and unenergized time cycles.

Where a liquid level switch 48 is used to control the valve 40, it is of course envisioned that the switch 48 has a hysteresis operation so that the solenoid valve 40 is activated at a relatively high liquid level in the accumulator 20 and deactivated at a much lower liquid level, preferably when the accumulator 20 is empty. The particular type of level switch 48, such as pressure head or float operated is immaterial to the concepts of the present invention.

From the above description of the preferred embodiments, it can be seen that a pressurized purging system is provided for quickly purging collected liquid in an accumulator connected to a liquid separator in a process vacuum system. The pressurized purging is conducted without interruption of the subatmospheric pressure flow in the vacuum system and without subjecting the vacuum system to the compressed air of the purging system. While the term "compressed air" is used herein, other pressurized gases could be utilized, such as an inert gas, where safety or other requirements make the use of a gas other than air preferable. It is noted that with the preferred embodiments, the liquid flow between the separator and the accumulator is interrupted only for that limited period required for the pressurized purging. The specifically described embodiments are merely illustrative of the preferred forms of practicing the present invention and are not intended to limit the scope thereof.

We claim:

1. A liquid drain system for a liquid separator associated with a process gas vacuum system wherein the process gas normally has moisture content, the vacuum system having a vacuum pump for generating a vacuum for the vacuum system, the vacuum pump being connected to the vacuum system by fluid communication means, the fluid communication means including said liquid separator and a liquid accumulator connected in fluid communication with said separator, a fluid conduit connecting said separator and said accumulator whereby liquid can flow from said separator to said accumulator, a pressure responsive drain valve in said fluid conduit, and a pressure sensitive drain connected to said accumulator, the improvement comprising:

a compressed air supply connected to said accumulator downstream of said drain valve, and a controller means for both directing pressurized air to close said drain valve and permitting said pressurized air to flow from said compressed air supply to said accumulator to purge said accumulator of liquid to said pressure sensitive drain while said accumulator is isolated from said separator by said pressure sensitive drain valve.

2. The liquid drain system of claim 1 wherein said controller means includes an orifice between said compressed air supply and said accumulator.

3. The liquid drain system of claim 1 wherein said air supply is timer operated.

4. The liquid drain system of claim 1 wherein said air supply is operated in response to a level of liquid in said accumulator.

5. The liquid drain system of claim 1 wherein said drain comprises a pressure sensitive valve.

6. A liquid drain system for a liquid separator associated with a process gas vacuum system wherein the process gas normally has moisture content, the vacuum system having a vacuum pump for generating a vacuum for the vacuum system, the vacuum pump being connected to the vacuum system by fluid communication means, the fluid communication means having said liquid separator, a liquid accumulator, a fluid conduit connecting said separator and said accumulator whereby liquid removed from said separator can be drained to said accumulator, a first drain valve in said fluid conduit means, and a drain including a second drain valve connected to said accumulator, the improvement comprising:

a compressed air supply connected to said accumulator downstream of said first drain valve, an air supply valve for controlling the flow of compressed air from said supply to said accumulator coupled between said air supply and said accumulator, and a controller means for simultaneously closing said drain valve and opening said air supply valve and said second drain valve at an initiation of a purging cycle to isolate said accumulator from said separator while subjecting said accumulator to pressurized air and connecting said accumulator to said drain, said controller means opening said first drain valve and closing said air supply valve and said second drain valve at an end of said purging cycle.

7. The liquid drain system of claim 6 wherein said controller means include a solenoid operated air supply valve, a pressure piloted first drain valve, and wherein said second drain valve is a check valve whereby opening of said air supply valve generates a pressure signal to operate said first drain valve and the subjecting of said accumulator to pressurized air by opening of said air supply valve generates sufficient pressure to open said check valve.

8. The liquid drain system of claim 7 wherein a timer is provided to initiate and terminate the purging cycle by controlling the opening and closing respectively of said solenoid operated air supply valve.

9. A method for pressure purging a liquid drain system associated with a process gas vacuum system without interruption of the vacuum system operation, said liquid drain system including a liquid separator in the vacuum system, a liquid accumulator and fluid conduit means connecting said accumulator with said separator, a drain valve in said fluid conduit means having an open position to permit the liquid separated by said separator to flow to said liquid accumulator and a closed position preventing fluid communication therebetween, and drain means connected to said accumulator, said method steps consisting of:

a) closing said drain valve to isolate said accumulator from said liquid separator, and b) pressurizing said liquid accumulator by placing a compressed air supply means in fluid communication therewith.

10. The method of claim 9 wherein said drain means has check valve means therein prohibiting fluid communication between said accumulator and drain when said accumulator is subject to vacuum and permitting fluid communication therebetween when said accumulator is subjected to pressure above atmospheric pressure and wherein the method further includes the step of opening said check valve means in response to step b).

11. The method of claim 9 wherein steps a) and b) occur simultaneously.

12. The method of claim 11 wherein said drain valve includes a pressure responsive member, and step a) occurs in response to step b).

* * * * *